United States Patent
Hirota et al.

(10) Patent No.: US 10,648,710 B2
(45) Date of Patent: May 12, 2020

(54) HEAT PUMP SYSTEM AND COOLING GENERATION METHOD

(71) Applicant: KABUSHIKI KAISHA TOYOTA CHUO KENKYUSHO, Nagakute-shi, Aichi (JP)

(72) Inventors: Yasuki Hirota, Nagakute (JP); Ryuichi Iwata, Nagakute (JP); Tsutomu Shinagawa, Nagakute (JP); Takafumi Yamauchi, Nagakute (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 92 days.

(21) Appl. No.: 16/078,130

(22) PCT Filed: Mar. 3, 2017

(86) PCT No.: PCT/JP2017/008546
§ 371 (c)(1),
(2) Date: Aug. 21, 2018

(87) PCT Pub. No.: WO2017/169511
PCT Pub. Date: Oct. 5, 2017

(65) Prior Publication Data
US 2019/0049159 A1    Feb. 14, 2019

(30) Foreign Application Priority Data
Mar. 30, 2016    (JP) ................. 2016-068698

(51) Int. Cl.
*F25B 25/02*    (2006.01)
*F25B 17/08*    (2006.01)
(Continued)

(52) U.S. Cl.
CPC ......... *F25B 25/02* (2013.01); *B60H 1/00899* (2013.01); *B60H 1/3201* (2013.01);
(Continued)

(58) Field of Classification Search
CPC ...... F25B 25/02; F25B 41/043; F25B 15/006; F25B 27/02; F25B 27/007; F25B 7/00;
(Continued)

(56) References Cited

U.S. PATENT DOCUMENTS

| 6,415,625 B1 * | 7/2002 | Rockenfeller ..... B60H 1/00007 62/476 |
| 2005/0016193 A1 * | 1/2005 | Tarasinski ............ B60H 1/3201 62/238.3 |

(Continued)

FOREIGN PATENT DOCUMENTS

| CN | 103453689 A | 12/2013 |
| JP | H07-055284 A | 3/1995 |

(Continued)

OTHER PUBLICATIONS

May 8, 2018 Office Action issued in Japanese Patent Application No. 2016-068698.
(Continued)

*Primary Examiner* — Frantz F Jules
*Assistant Examiner* — Lionel Nouketcha
(74) *Attorney, Agent, or Firm* — Oliff PLC (57) ABSTRACT

A heat pump system generates cooling by evaporating a refrigerant using an evaporator, and generates cooling by using a compressor to desorb refrigerant that has been evaporated by the evaporator and adsorbed at an adsorption device.

8 Claims, 9 Drawing Sheets

(51) Int. Cl.
*F25B 41/04* (2006.01)
*B60H 1/00* (2006.01)
*B60H 1/32* (2006.01)
*F25B 30/06* (2006.01)

(52) U.S. Cl.
CPC ......... *B60H 1/3204* (2013.01); *B60H 1/3213* (2013.01); *F25B 17/083* (2013.01); *F25B 30/06* (2013.01); *F25B 41/043* (2013.01)

(58) Field of Classification Search
CPC .. B60H 1/3204; B60H 1/3213; B60H 1/3201; F25D 11/003; F25D 11/025; F25D 11/027
See application file for complete search history.

(56) References Cited

U.S. PATENT DOCUMENTS

| | | | |
|---|---|---|---|
| 2009/0126371 A1 | 5/2009 | Powell et al. | |
| 2010/0192602 A1* | 8/2010 | Brooks | B60H 1/005 62/101 |
| 2014/0096560 A1 | 4/2014 | Kim et al. | |

FOREIGN PATENT DOCUMENTS

| | | | |
|---|---|---|---|
| JP | 2005-172380 A | | 6/2005 |
| JP | 2005172380 A | * | 6/2005 |
| JP | 2008-537090 A | | 9/2008 |
| JP | 2012-237505 A | | 12/2012 |
| JP | 2014-076792 A | | 5/2014 |

OTHER PUBLICATIONS

May 16, 2017 International Search Report issued in International Patent Application No. PCT/JP2017/008546.
May 16, 2017 Written Opinion of the International Searching Authority issued in International Patent Application No. PCT/JP2017/008546.
Sep. 11, 2018 Office Action issued in Japanese Patent Application No. 2016-068698.

* cited by examiner

HEAT PUMP SYSTEM AND COOLING GENERATION METHOD

TECHNICAL FIELD

Technology disclosed herein relates to a heat pump system and a cooling generation method.

BACKGROUND ART

Patent Literature 1 describes a vehicle air-conditioning system configured including an expansion valve that expands condensed refrigerant, an evaporator that evaporates the expanded refrigerant by heat exchange with air, and a compressor that compresses the refrigerant when in an evaporated gaseous state, respectively coupled together through a refrigerant line.

CITATION LIST

Patent Literature

PTL 1: Japanese Patent Application Laid-Open (JP-A) No. 2014-76792

Heat pump systems that generate cooling do so through the evaporation of refrigerant in an evaporator; this cooling is caused to act on a cooling target so as to cool the cooling target.

SUMMARY OF INVENTION

Technical Problem

There are limits to the generation efficiency of cooling when cooling generation uses refrigerant evaporation alone.

An embodiment of the present invention has been suggested in consideration of such a situation, and provides a heat pump system and a cooling generation method capable of performing efficient cooling generation.

Solution to Problem

A heat pump system of a first aspect includes: an evaporator that cools a cooling target by evaporation of a refrigerant; a compressor that compresses the refrigerant in a gaseous phase; and an adsorption device at which the refrigerant evaporated at the evaporator is adsorbed, and that cools the cooling target by desorption of the refrigerant by movement of the refrigerant toward the compressor.

In this heat pump system, the refrigerant is evaporated at the evaporator, and the cooling target is cooled by latent heat of evaporation.

The refrigerant evaporated at the evaporator is adsorbed in the adsorption device. The refrigerant adsorbed in the adsorption device moves toward the compressor and the refrigerant frigerant is desorbed from the adsorption device because of compression of the refrigerant by the compressor. In the compressor, the cooling target is cooled by desorption heat of the refrigerant.

In this manner, not only is the refrigerant cooled by evaporation of the refrigerant in the evaporator, but also by desorption of the refrigerant from the adsorption device, thereby enabling efficient cooling generation to be performed.

A second aspect is the first aspect, further including a condenser that condenses the refrigerant compressed by the compressor, and an expander that cause the refrigerant condensed by the condenser to expand and conveys the refrigerant to the evaporator.

Accordingly, the refrigerant compressed by the compressor can be condensed into liquid by the condenser. The expander expands the refrigerant condensed into liquid and conveys the refrigerant to the evaporator. In this manner, the refrigerant is circulated, enabling the evaporator and the adsorption device to be employed in cooling generation.

A third aspect is the first aspect or the second aspect, wherein plural of adsorption devices are disposed in parallel, with respect to a movement direction of the refrigerant, between the evaporator and the compressor.

Accordingly, refrigerant can be adsorbed in at least one of the plural adsorption devices, and refrigerant can be desorbed in at least one other of the adsorption devices. Considering the plural adsorption devices as a whole, continuous operation is possible, thereby enabling continuous or long-term cooling generation by the heat pump system.

A fourth aspect is the third aspect, wherein the cooling target flows through, and is cooled by, the evaporator and an adsorption device, among the plural adsorption devices, at which refrigerant is desorbed.

The cooling target is cooled by the adsorption device where adsorbed refrigerant is desorbed, and is further cooled by the evaporator. This enables the cooling target to be continuously cooled by the adsorption device and the evaporator.

A fifth aspect is any one of the first aspect to the fourth aspect, wherein the refrigerant is desorbed using the compressor, from an adsorption device, among the plurality of adsorption devices, that has already adsorbed the refrigerant evaporated at the evaporator.

In this manner, the plural adsorption devices can be operated to switch alternately such that refrigerant is desorbed from the adsorption device that is not adsorbing the refrigerant. This enables continuous operation when considering the plural adsorption devices as a whole.

A sixth aspect is any one of the first aspect to the fifth aspect, wherein the adsorption device adsorbs the refrigerant at a saturated vapor pressure of the refrigerant in the evaporator.

Namely, when the pressure of the refrigerant reaches the saturated vapor pressure at a specific temperature of the evaporator, refrigerant can be reliably adsorbed in the adsorption device.

A seventh aspect is a cooling generation method including: generating cooling by evaporating refrigerant using an evaporator; and generating cooling by desorbing, using a compressor, the refrigerant from an adsorption device that has already adsorbed the refrigerant evaporated at the evaporator.

Not only is cooling generated by evaporating refrigerant in the evaporator, but cooling is also generated by using the compressor to compress the refrigerant adsorbed in the adsorption device. This enables efficient cooling generation to be performed.

An eighth aspect is the seventh aspect, further including: providing plural of the adsorption devices; and while the refrigerant evaporated at the evaporator is being absorbed in at least one of the adsorption devices, using the compressor to desorb the refrigerant from at least another one of the adsorption devices.

Namely, the refrigerant can be adsorbed in at least one of the plural adsorption devices, and refrigerant can be desorbed in at least another one of the plural adsorption devices.

Considering the plural adsorption devices as a whole, continuous or long-term cooling generation is possible.

Advantageous Effects of Invention

According to an embodiment of the invention, it is possible to perform efficient cooling generation.

DESCRIPTION OF EMBODIMENTS

Figure 1:
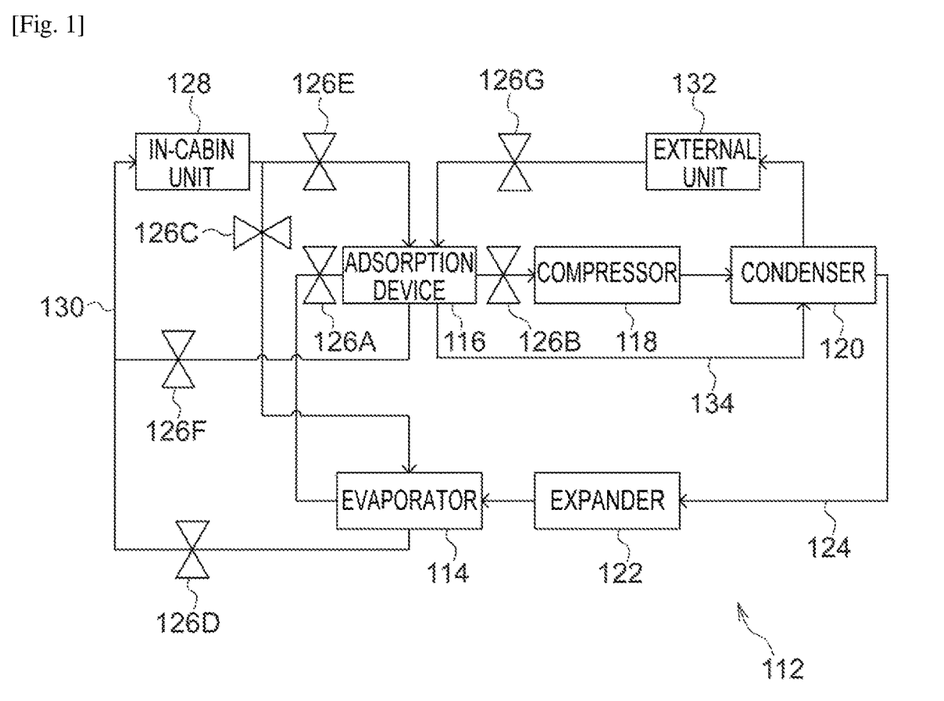
FIG. 1 is a schematic diagram illustrating a configuration of a heat pump system of a first exemplary embodiment.

As illustrated in FIG. 1, a heat pump system 112 of a first exemplary embodiment according to the technique of the present disclosure includes an evaporator 114, an adsorption device 116, a compressor 118, a condenser 120, and an expander 122. These are connected by refrigerant tubes 124 such that from the evaporator 114, refrigerant passes (circulates) through the adsorption device 116, the compressor 118, the condenser 120, and the expander 122 in sequence, before returning to the evaporator 114.

The refrigerant tubes 124 are provided with respective open-close valves 126A, 126B between the evaporator 114 and the adsorption device 116, and between the adsorption device 116 and the compressor 118.

Figure 2:
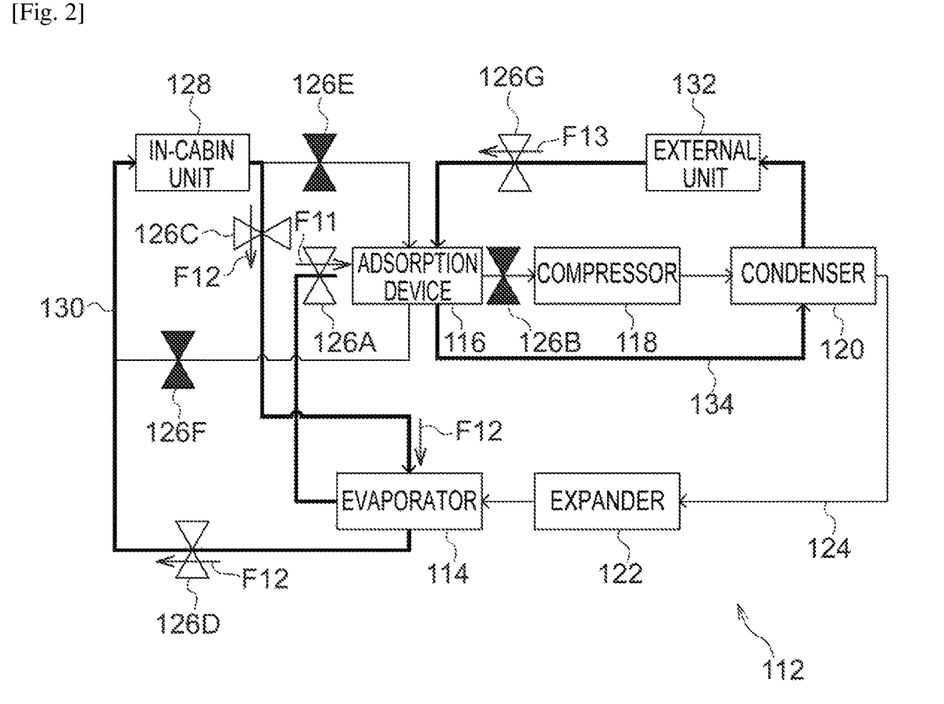
FIG. 2 is a schematic diagram illustrating operation of a heat pump system of the first exemplary embodiment.
Figure 3:
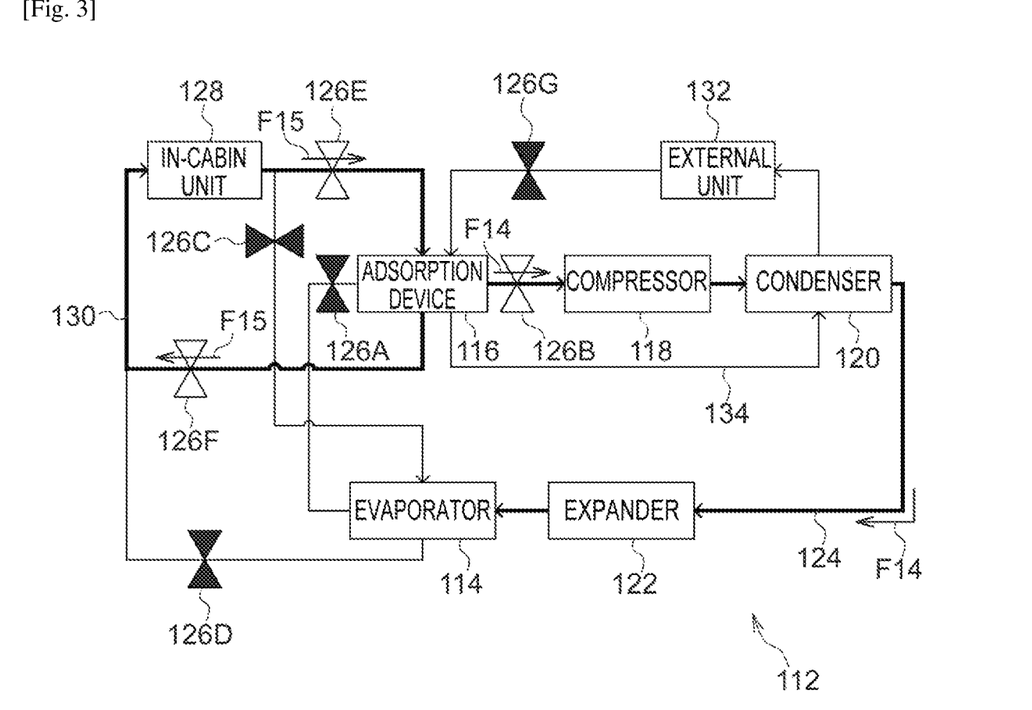
FIG. 3 is a schematic diagram illustrating operation of a heat pump system of the first exemplary embodiment.

An in-cabin unit 128 is connected to the evaporator 114 and the adsorption device 116. The in-cabin unit 128 is connected to the evaporator 114 and the adsorption device 116 in parallel, through circulation tubes 130. As illustrated in FIG. 2 and FIG. 3, a cooling target can be circulated between the in-cabin unit 128 and either the evaporator 114 or the adsorption device 116 by opening and closing open-close valves 126C, 126D, 126E, and 126F.

An external unit 132 is connected to the adsorption device 116 and the condenser 120. The external unit 132 is connected in series with the adsorption device 116 and the condenser 120 through cooling tubes 134. A cooling medium flows in sequence from the external unit 132 to the adsorption device 116, and then to the condenser 120 before returning to the external unit 132, thereby enabling heat of the adsorption device 116 and the condenser 120 to be expelled to the outside. The cooling tubes 134 are provided with an open-close valve 126G, enabling opening and closing of the cooling tubes 134.

Note that in the drawings illustrating operation of the heat pump system (for the first exemplary embodiment, FIG. 2 and FIG. 3), valves in an open state are shown in white, and valves in a closed state are shown in black. Moreover, tubes through which fluid is flowing are shown thicker than tubes through which fluid is not flowing.

The evaporator 114 cools a cooling target by evaporation of a refrigerant. The compressor 118 compresses the refrigerant in a gaseous phase. The adsorption device 116 at which the refrigerant evaporated at the evaporator 114 is adsorbed, cools the cooling target by desorption of the refrigerant due to movement of the refrigerant toward the compressor. The condenser 120 condenses the refrigerant compressed by the compressor 118. The expander 122 expands the refrigerant condensed by the condenser 120 and conveys the refrigerant to the evaporator 114.

In the heat pump system 112 of the first exemplary embodiment, cooling generated when the refrigerant is evaporated by the evaporator 114 acts on the cooling target, enabling the cooling target to be cooled. Moreover, cooling generated when adsorbed refrigerant is desorbed from the adsorption device 116 also acts on the cooling target, enabling the cooling target to be cooled. Opening and closing the open-close valves 126C, 126D, 126E, and 126F switches the flow path of the cooling target to either the evaporator 114 side or the adsorption device 116 side, thereby enabling the cooling target to receive cooling from either the evaporator 114 or the adsorption device 116.

For example, in the state illustrated in FIG. 2, in the refrigerant tubes 124, the open-close valve 126A is in an open state, and the open-close valve 126B is in a closed state. As illustrated by the arrow F11, the refrigerant can be made to flow from the evaporator 114 to the adsorption device 116, but the refrigerant does not flow from the adsorption device 116 to the compressor 118. In the circulation tubes 130, the open-close valves 126C, 126D are in an open state, and the open-close valves 126E, 126F are in a closed state. Accordingly, as illustrated by the arrows F12, the cooling target flows through the evaporator 114, and cooling generated in the evaporator 114 acts on the cooling target, thereby cooling the cooling target.

In this state, the open-close valve 126G is in an open state. As illustrated by the arrow F13, cooling water flows through the adsorption device 116. Adsorption heat (warm heat) generated in the adsorption device 116 can be made to act on the cooling water.

In contrast, in the state illustrated in FIG. 3, in the refrigerant tubes 124, the open-close valve 126A is in a closed state, and the open-close valve 126B is in an open state. As illustrated by the arrows F14, the refrigerant can be made to flow from the adsorption device 116 to the compressor 118, but the refrigerant does not flow from the evaporator 114 to the adsorption device 116. Moreover, in the circulation tubes 130, the open-close valves 126C, 126D are in a closed state, and the open-close valves 126E, 126F are in an open state. Accordingly, as illustrated by the arrows F15, the cooling target flows through the adsorption device 116, such that cooling generated in the adsorption device 116 acts on the cooling target, thereby cooling the cooling target. The adsorbed refrigerant is desorbed from the adsorption device 116, thereby regenerating the adsorption device 116.

In this manner, in the heat pump system 112 of the first exemplary embodiment, not only is cooling generated by latent heat of evaporation in the evaporator 114, but cooling is also generated by desorption heat in the adsorption device 116. Cooling is generated in two stages (two processes) in a single refrigerant circulation cycle, thereby enabling more efficient cooling generation than in a configuration in which cooling is generated in one stage (one process).

Figure 4:
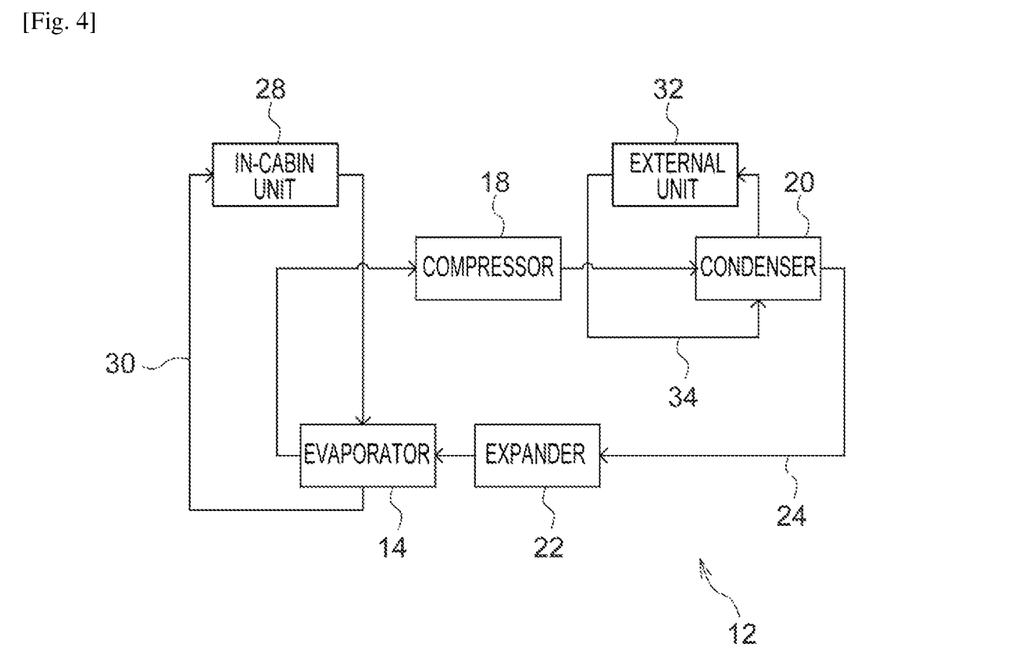
FIG. 4 is a schematic diagram illustrating configuration of a heat pump system of a comparative example.

FIG. 4 illustrates a heat pump system 12 of a comparative example. In the heat pump system 12 of the comparative example, an evaporator 14, a compressor 18, a condenser 20, and an expander 22 are connected by refrigerant tubes 24. However, the heat pump system 12 of the comparative example does not include an adsorption device. Circulation tubes 30 connect an in-cabin unit 28 to the evaporator 14 alone, and cooling tubes 34 connect an external unit 32 to the condenser 20 alone. Note that illustration of the open-close valves on the respective tubes is omitted in FIG. 4.

Figure 5:
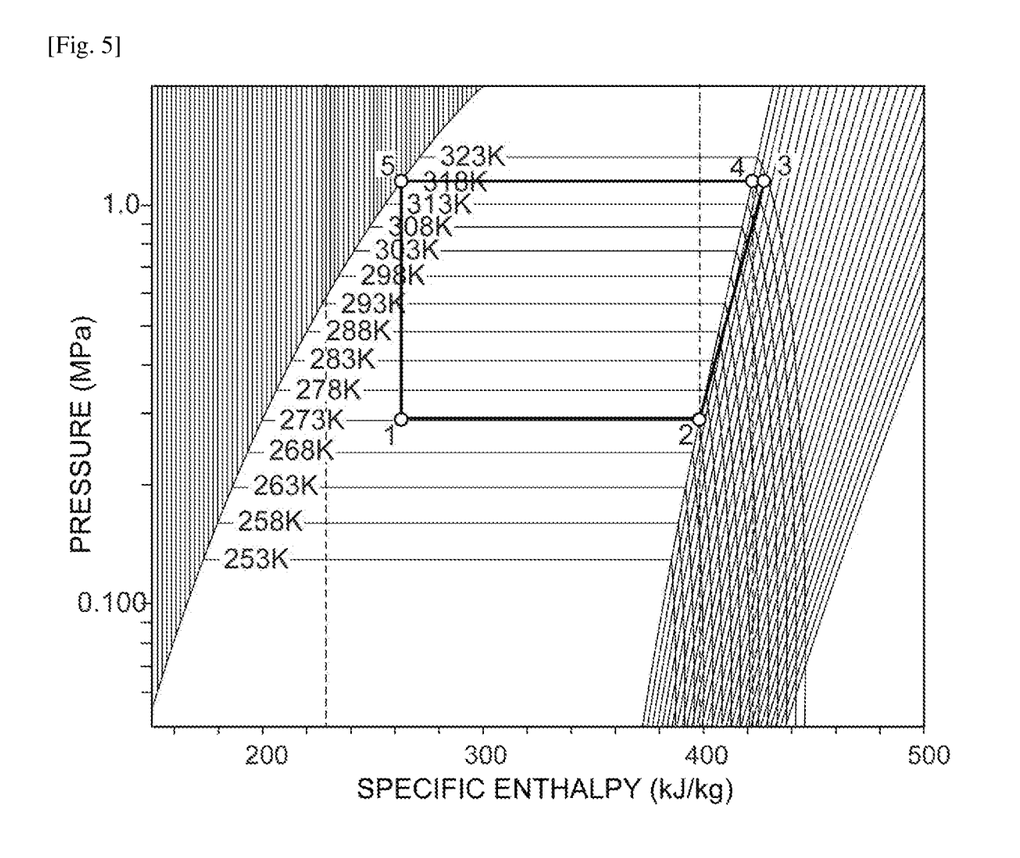
FIG. 5 is a graph illustrating an example of a refrigerant cooling generation cycle of a heat pump system of a comparative example as a pressure-enthalpy diagram.
Figure 6:
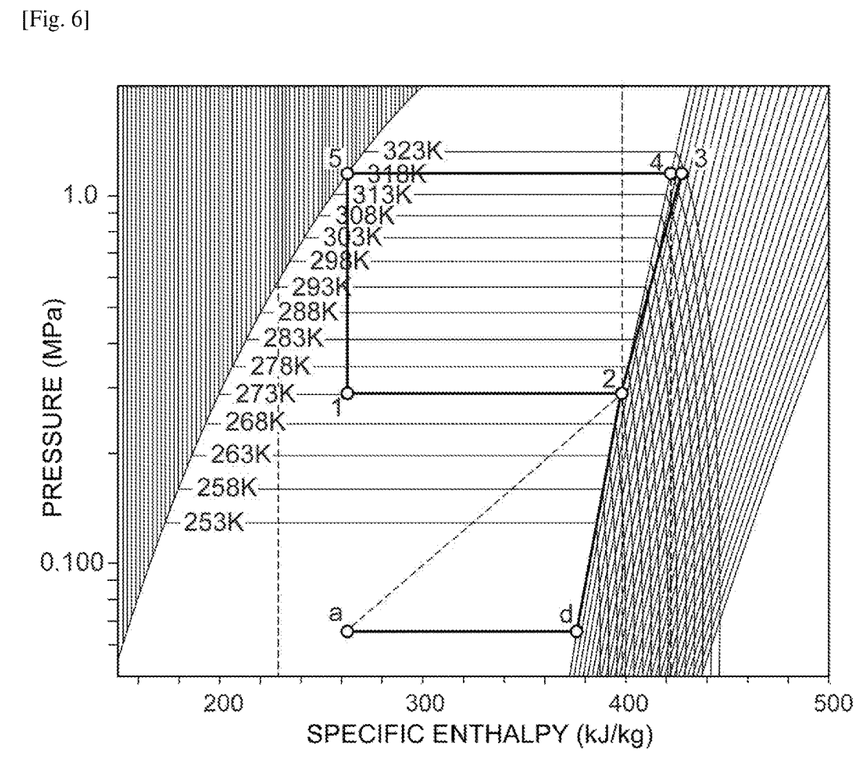
FIG. 6 is a graph illustrating an example of a refrigerant cooling generation cycle of a heat pump system of the first exemplary embodiment as a pressure-enthalpy diagram.

In the following, conversion efficiency (COP) is considered for the first exemplary embodiment and the comparative example, for a case in which a hydrofluorocarbon (R134a) refrigerant is employed. FIG. 5 illustrates the cooling generation cycle of the comparative example as a pressure-specific enthalpy diagram, and FIG. 6 illustrates the cooling generation cycle of the first exemplary embodiment as a pressure-specific enthalpy diagram. Hereafter, specific enthalpy is referred to simply as "enthalpy".

Firstly, in the heat pump system 12 of the comparative example, the evaporation temperature of the refrigerant in the evaporator 14 is 0° C., and the condensation temperature of the refrigerant in the condenser 20 is 45° C. The evaporation of the refrigerant in the evaporator 14 corresponds to the change from state 1 to state 2 in the cooling generation cycle illustrated in FIG. 5. The enthalpy $h_2$ in state 2 is $h_2$=400.0 kJ/kg and the enthalpy $h_1$ in state 1 is $h_1$=262.5 kJ/kg. The cooling $q_{e1}$ generated in this case is therefore $q_{e1}=h_2-h_1$=137.5 kJ/kg.

The change in state from state 2 to state 3 in the cooling generation cycle illustrated in FIG. 5 occurs in the compressor 18. The enthalpy $h_3$ in state 3 is $h_3$=433.0 kJ/kg.

The theoretical work L is therefore $L=h_3-h_2$=33 kJ/kg.

The theoretical conversion efficiency COP of the heat pump system 12 of the comparative example is therefore COP=$q_{e1}$/L=3.86.

Next, the cooling generation cycle of the heat pump system 112 of the first exemplary embodiment is considered. In the heat pump system 112 of the first exemplary embodiment, the refrigerant evaporates at 0° C. in the evaporator 114, similarly to in the heat pump system 12 of the comparative example. Accordingly, if configuration is made such that adsorption of refrigerant having a saturated vapor pressure corresponding to 0° C. can be performed at the refrigerant adsorption temperature (here, 45° C.) in the adsorption device 116, then evaporation equivalent to that of the heat pump system 12 of the comparative example can be caused in the evaporator 114. This corresponds to the change from state 1 to state 2 in the cooling generation cycle illustrated in FIG. 6; this change is similar to the change from state 1 to state 2 in the heat pump system 12 of the comparative example.

Specifically, the saturated vapor pressure P (0° C.) at 0° C. is

P (0° C.)=293.18 kPa, and the vapor pressure P (45° C.) at 45° C. is

P (45° C.)=1158.82 kPa.

Therefore, the relative pressure $\varphi 2$ is $\varphi 2 = P(0°\ C.)/P(45°\ C.)$=0.253.

Namely, it can be said that by employing an adsorbent capable of adsorbing the refrigerant even at a relative pressure of 0.253, cooling equivalent to the cooling in the evaporator 14 of the comparative example can be obtained in the evaporator 114 of the heat pump system 112 of the first exemplary embodiment.

In the heat pump system 112 of the first exemplary embodiment, cooling is also generated by desorbing refrigerant from the adsorption device 116. As described above, the adsorbent employed in the adsorption device 116 is an absorbent that adsorbs the refrigerant at a relative pressure of 0.253 at 0° C. Accordingly, in the adsorption device 116 the refrigerant may be desorbed at a relative pressure of 0.253 or lower. Taking into account a pressure difference, the following is calculated on the basis that the refrigerant is desorbed from the adsorption device 116 at a relative pressure of 0.22. The saturated vapor pressure P (0° C.) at 0° C. is P (0° C.)=293.18 kPa, and so the pressure P3 capable of desorbing the refrigerant is $P3=P$ (0° C.)×0.22=64.5 kPa.

Namely, the refrigerant can be desorbed from the adsorption device 116 if a pressure of P3 or lower is made to act on the adsorption device 116. In the cooling generation cycle in FIG. 6, due to adsorption of the refrigerant in the adsorption device 116, following state 2, a state is reached in which the pressure and enthalpy have dropped. State a illustrated in FIG. 6 is an example of such a state in which the pressure and enthalpy have dropped. Note that the point indicated as state a in FIG. 6 is an approximation, since in reality the refrigerant is adsorbed by the adsorbent. In the cooling generation cycle illustrated in FIG. 6, the refrigerant then changes state to a state d because of desorption in the adsorption device 116.

During desorption of the refrigerant from the adsorption device 116, cooling is generated by the cooling $q_{e1}$ when the refrigerant evaporates in the evaporator 114 being multiplied by $\Delta H_{ad}/\Delta H_{eve}$. Note that $\Delta H_{ad}$ is the heat of adsorption during adsorption in the adsorption device 116, and $\Delta H_{eve}$ is the latent heat of evaporation when the refrigerant evaporates in the adsorption device. When activated carbon is employed as the adsorbent of the adsorption device 116, there is a correlation between the value of $\Delta H_{ad}/\Delta H_{eve}$ and the adsorption amount. It is known that for an adsorption amount in the region of 1.2 kg/kg, this value is approximately 1.6 (see C312-2, collected papers from the 2015 annual conference of the Japan Society of Refrigerating and Air-Conditioning Engineers).

Figure 7:
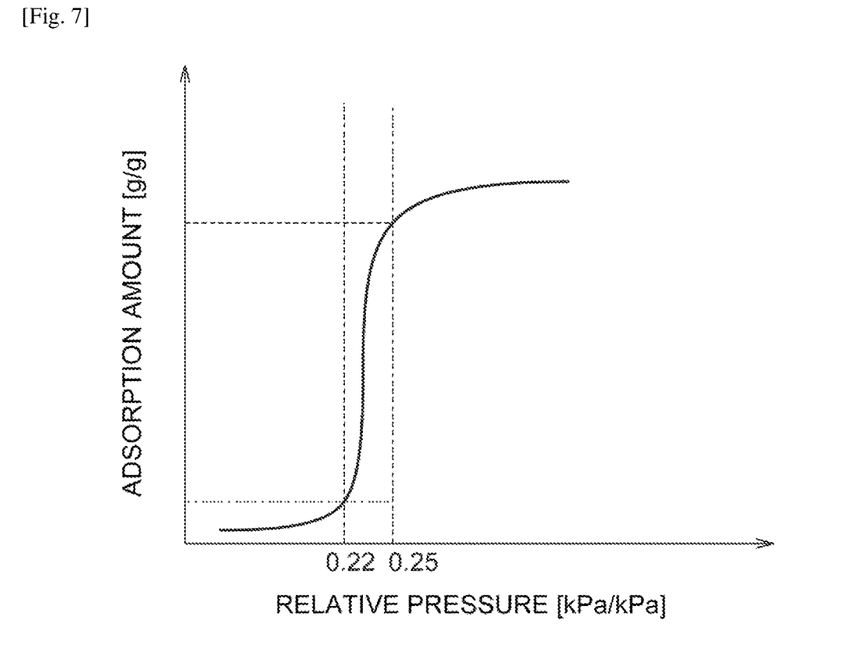
FIG. 7 is a graph illustrating an example of an adsorption isotherm of an adsorbent in a heat pump system of the first exemplary embodiment.

In the heat pump system 112 of the first exemplary embodiment, a refrigerant adsorption amount 1.2 kg/kg may be anticipated in the adsorption device 116. Accordingly, cooling generated during desorption of the refrigerant from the adsorption device is $1.6 \times q_{e1}$. FIG. 7 illustrates an example of an adsorption isotherm for an adsorbent capable of adsorbing the refrigerant at a relative pressure of 0.253 and of desorbing the refrigerant at a relative pressure of 0.22.

During desorption of the refrigerant from the adsorption device 116, the temperature of the adsorbent and the refrigerant drops. This drop in temperature results in a sensible heat loss Q, which does not contribute to cooling of the cooling target. When 1 kg of activated carbon (specific heat: 0.71 kJ/kg/K) is employed as the adsorbent, and 1 kg of R134a (specific heat: 1.4289 kJ/kg/K) is employed as the refrigerant, then $$Q=(0.71 \times 1 \times 45)+(1.4289 \times 1 \times 45)=96.25 \text{ kJ}.$$

In order to desorb the refrigerant from the adsorption device 116, work L2 is required in order to compress the refrigerant from the pressure P3 capable of desorbing the refrigerant, to the pressure P (45° C.) at a temperature of 45° C. The work L2 corresponds to a change from state d to state 3 in the cooling generation cycle illustrated in FIG. 6. Specifically, the enthalpy $h_d$ at state d is $$h_d=377 \text{ kJ/kg, and therefore}$$

$$L2=h_3-h_d=56 \text{ kJ/kg}.$$

As described above, the conversion efficiency COP of the heat pump system 112 of the first exemplary embodiment is $$COP=(q_{e1}+1.6 \times q_{e1}-Q)/L2=4.67.$$

Since the COP of the heat pump system 12 of the comparative example is 3.86, the cooling generation efficiency is improved by 21%.

Next, explanation follows regarding a second exemplary embodiment. In the second exemplary embodiment, elements, members, and the like equivalent to those of the first exemplary embodiment are allocated the same reference numerals, and detailed explanation thereof is omitted.

Figure 8:
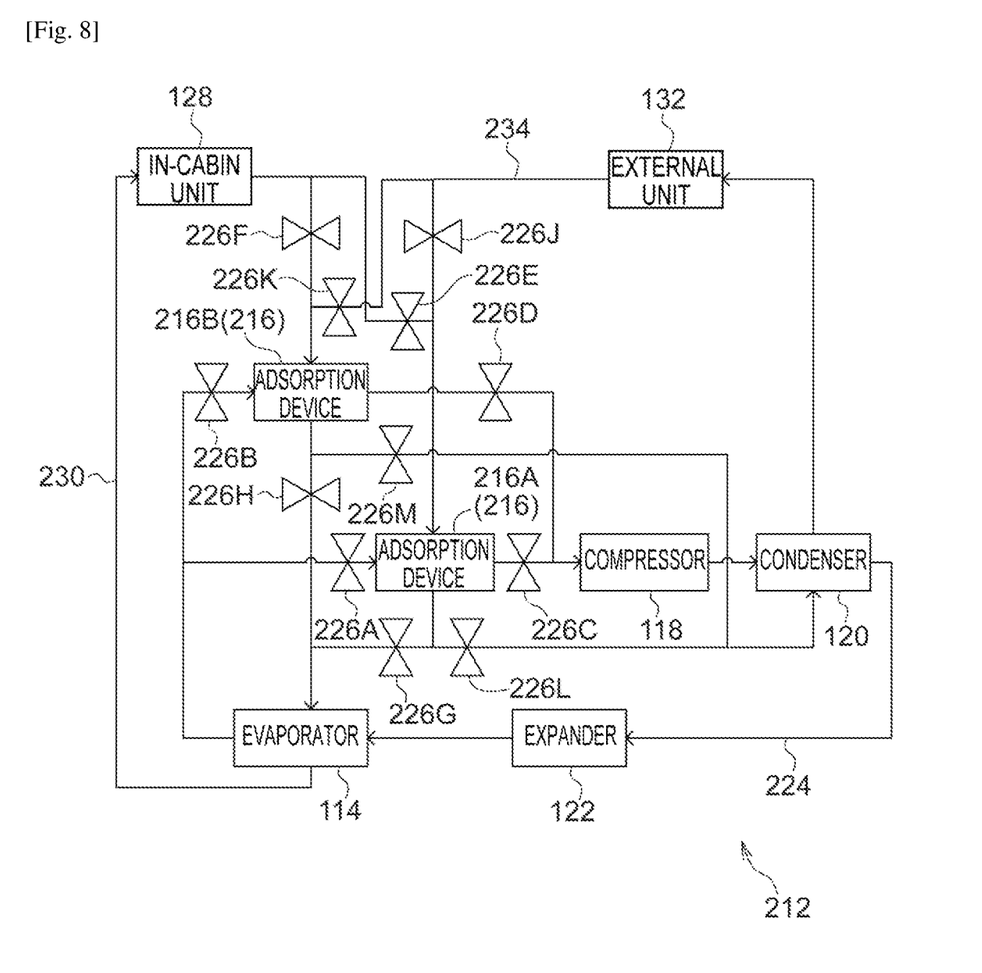
FIG. 8 is a schematic diagram illustrating a configuration of a heat pump system of a second exemplary embodiment.

As illustrated in FIG. 8, a heat pump system 212 of the second exemplary em- bodiment includes two adsorption devices 216. When specifically differentiating between the two adsorption devices 216, they are referred to as adsorption device 216A and adsorption device 216B. Note that in the heat pump system 212 of the second exemplary embodiment, the two adsorption devices 216 are equivalent in terms of refrigerant adsorption and desorption capabilities and the like.

The adsorption devices 216A, 216B are disposed in parallel to each other in the movement direction of the refrigerant from the evaporator 114 to the compressor 118. Refrigerant tubes 224 of the second exemplary embodiment branch into two between the evaporator 114 and the adsorption devices 216A, 216B, and merge into one between the adsorption devices 216A, 216B and the compressor 118. As viewed along the flow direction of the refrigerant, open-close valves 226A, 226B are provided upstream of the adsorption devices 216A, 216B, and open-close valves 226C, 226D are provided downstream of the adsorption devices 216A, 216B.

In the second exemplary embodiment, the adsorption devices 216 and the evaporator 114 are connected to the in-cabin unit 128 through circulation tubes 230. The circulation tubes 230 branch into two between the in-cabin unit 128 and the adsorption devices 216A, 216B and merge into one between the adsorption devices 216A, 216B and the evaporator 114. As viewed along the flow direction of the cooling target, open-close valves 226E, 226F are provided upstream of the adsorption devices 216A, 216B, and open-close valves 226G, 226H are provided downstream of the adsorption devices 216A, 216B.

In the second exemplary embodiment, the adsorption devices 216 and the condenser 120 are connected to the external unit 132 through cooling water tubes 234. The cooling water tubes 234 branch into two between the external unit 132 and the adsorption devices 216A, 216B and merge into one between the adsorption devices 216A, 216B and the condenser 120. As viewed along the cooling water flow direction, open-close valves 226J, 226K are provided upstream of the adsorption devices 216A, 216B, and open-close valves 226L, 226M are provided downstream of the adsorption devices 216A, 216B.

In the heat pump system 212 of the second exemplary embodiment, the open-close valves 226A, 226B, 226C, and 226D are opened and closed as appropriate such that the refrigerant evaporated in the evaporator 114 is adsorbed in either one of the two adsorption devices 216A, 216B. Moreover, the open-close valves 226E, 226F, 226G, 226H are opened and closed as appropriate so as to enable refrigerant to be desorbed using the heat of the cooling medium conveyed from the in-cabin unit 128 in order to regenerate the adsorption device that is not adsorbing the refrigerant.

Figure 9:
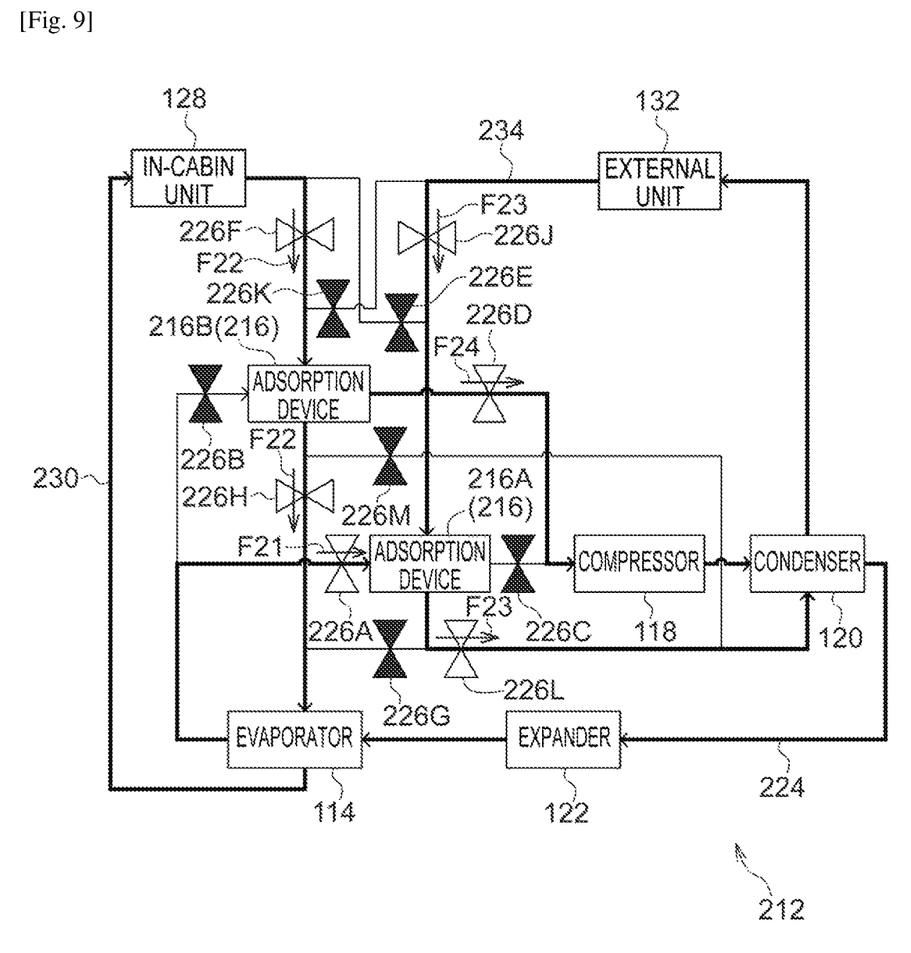
FIG. 9 is a schematic diagram illustrating operation of a heat pump system of the second exemplary embodiment.

For example, in the state illustrated in FIG. 9, the open-close valve 226A is in an open state. As illustrated by the arrow F21, refrigerant flows from the evaporator 114 into the adsorption device 216A and is adsorbed in the adsorption device 216A. Since the open-close valve 226C is in a closed state, the refrigerant does not move from the adsorption device 216A to the compressor 118. However, the open-close valve 226F is in an open state. As illustrated by the arrows F22, the cooling target moves from the in-cabin unit 128 toward the adsorption device 216B in which the refrigerant is not being adsorbed, thereby regenerating the adsorption device 216B and cooling the cooling target.

Moreover, since the open-close valve 226H is also in an open state, the cooling target also moves to the evaporator 114 and is further cooled before returning to the in-cabin unit 128. Namely, the cooling target is first subject to cooling in the adsorption device 216B and is then subject to cooling in the evaporator 114.

The open-close valve 226J is in an open state. As illustrated by the arrows F23, cooling water flows from the external unit 132 toward the adsorption device 216A in which the refrigerant is being adsorbed, and the cooling water recovers adsorption heat from the adsorption device 216A. Moreover, since the open-close valve 226L is in an open state, the cooling water also recovers condensation heat in the condenser 120 before returning to the external unit 132, where heat from the cooling water is released. Since the open-close valve 226D is in an open state, as illustrated by the arrow F24, the refrigerant desorbed from the adsorption device 216B moves toward the compressor 118. That is, the refrigerant moves, from the adsorption device 216B that has already adsorbed the refrigerant evaporated at the evaporator, toward the compressor 118 and is desorbed using the compressor 118.

Figure 10:
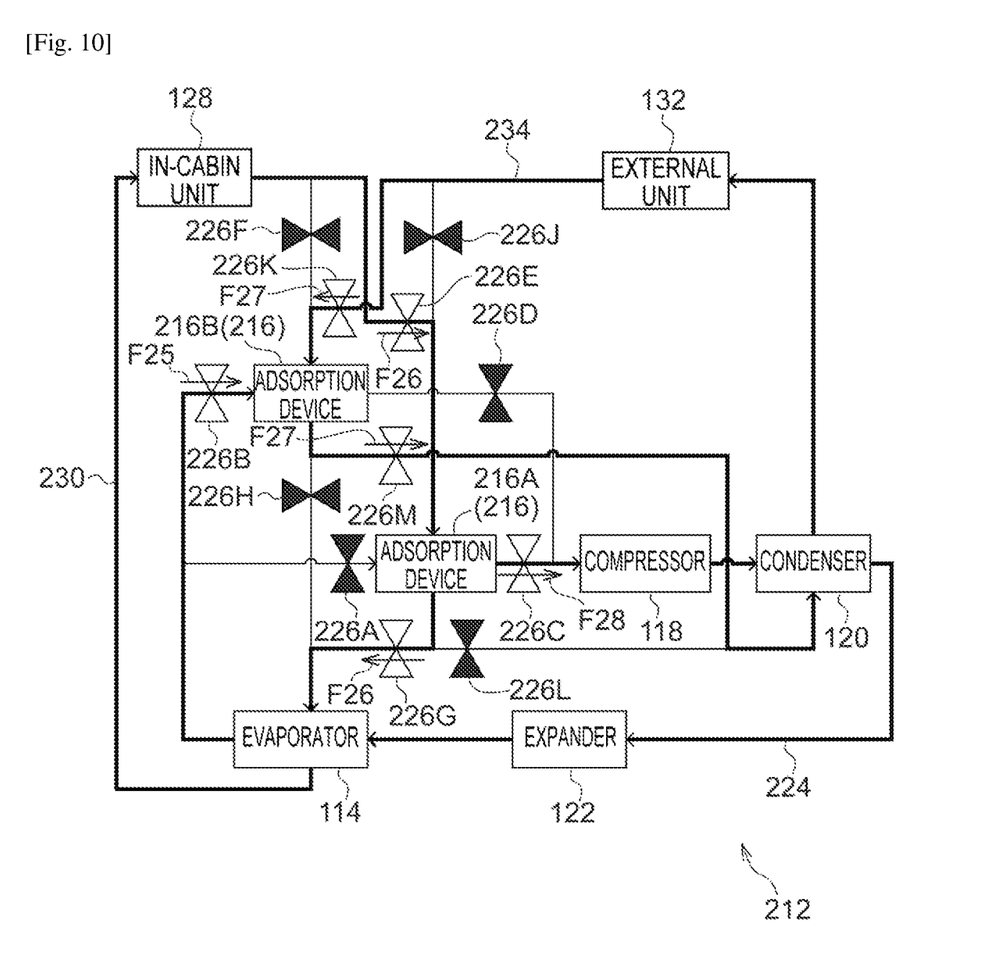
FIG. 10 is a schematic diagram illustrating operation of a heat pump system of the second exemplary embodiment.

In the state illustrated in FIG. 10, the open-close valve 226B is in an open state. As illustrated by the arrow F25, the refrigerant flows from the evaporator 114 into the adsorption device 216B and is adsorbed in the adsorption device 216B. Since the open-close valve 226D is in a closed state, refrigerant does not move from the adsorption device 216B toward the compressor 118. However, the open-close valve 226E is in an open state. As illustrated by the arrow F26, the cooling target moves from the in-cabin unit 128 toward the adsorption device 216A in which refrigerant is not being adsorbed, thereby regenerating the adsorption device 216A and cooling the cooling target.

Moreover, since the open-close valve 226G is also in an open state, the cooling target moves to the evaporator 114 as well and is further cooled before returning to the in-cabin unit 128. Namely, the cooling target is first subject to cooling in the adsorption device 216A and is then subject to cooling in the evaporator 114.

The open-close valve 226K is in an open state. As illustrated by the arrow F27, cooling water from the external unit 132 flows toward the adsorption device 216B in which the refrigerant is being adsorbed, and the cooling water recovers adsorption heat of the adsorption device 216B. Moreover, since the open-close valve 226M is in an open state, the cooling water also recovers condensation heat in the condenser 120 before returning to the external unit 132 and releasing heat. Since the open-close valve 226C is in an open state, as illustrated by the arrow F28, the refrigerant desorbed from the adsorption device 216A moves toward the compressor 118.

In this manner, in the heat pump system 212 of the second exemplary embodiment, the two adsorption devices 216 can be operated so as to switch alternately between an adsorption state and a desorption state. Since one or other of the adsorption devices 216 is operating as a counterparty to the evaporator 114, the refrigerant can be evaporated continuously, thereby enabling continuous cooling generation.

Moreover, in this manner, in the heat pump system 212 of the second exemplary embodiment, operation of the two adsorption devices 216 is switched alternately, thereby enabling the condensation temperature in the condenser 120 to be made lower than in the heat pump system 112 of the first exemplary embodiment. For example, if the adsorption temperature of the adsorption devices 216 of the second exemplary embodiment is 41.5° C., then $$\varphi_2 = P\,(0°\,C.)/P\,(41.5°\,C.) = 0.33.$$

Moreover, if the desorption temperature of the adsorption devices 216 is 5.8° C., the relative pressure for desorbing the refrigerant is $$P_3/P\,(5.8°\,C.) = 0.182.$$

Figure 12:
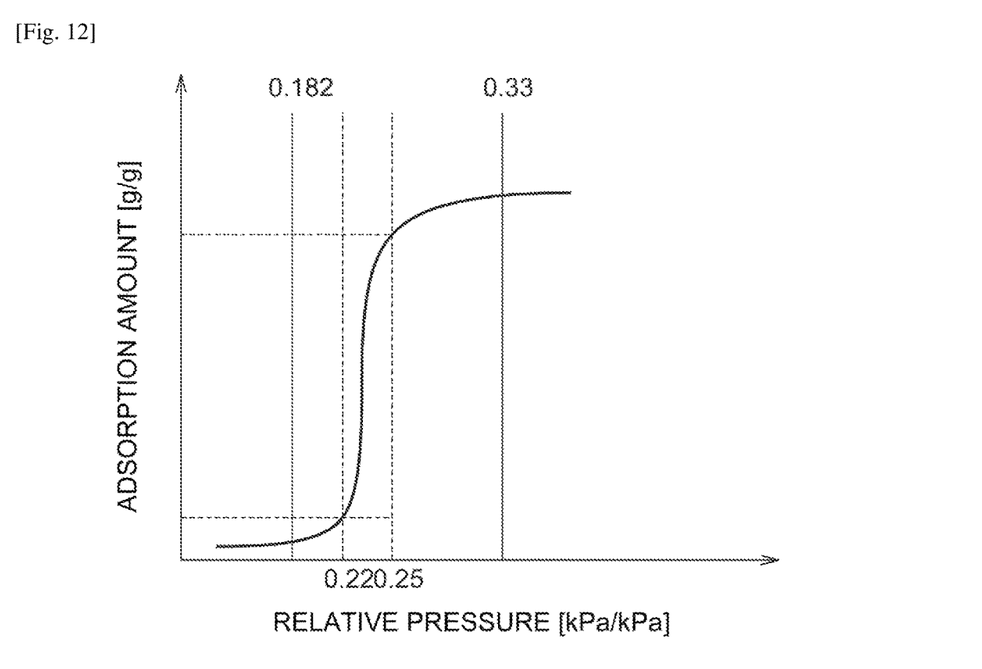
FIG. 12 is a graph illustrating an example of an adsorption isotherm of an adsorbent in a heat pump system of the second exemplary embodiment.
Figure 13:
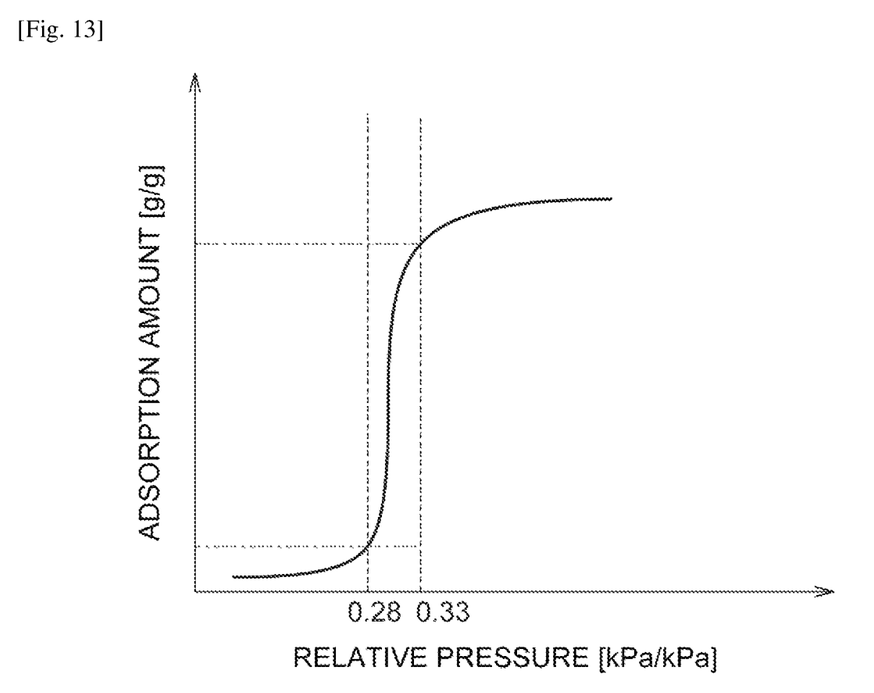
FIG. 13 is a graph illustrating an example of an adsorption isotherm of an adsorbent in a heat pump system of the second exemplary embodiment.

Namely, as illustrated in FIG. 12, there is an increase in the relative pressure range for operating the adsorption devices 216. This thereby increases the types of materials that can be employed as the adsorbent.

Moreover, in the second exemplary embodiment, a situation is anticipated in which a pressure P3 for desorbing the refrigerant from the adsorption devices 216 is set at 100 kPa. In such cases, as in the cooling generation cycle illustrated in FIG. 11, the pressure in state a and state d is 100 kPa, and a lower work L2 is sufficient to compress the refrigerant in the compressor 118 (change from state d to state 3).

Figure 11:
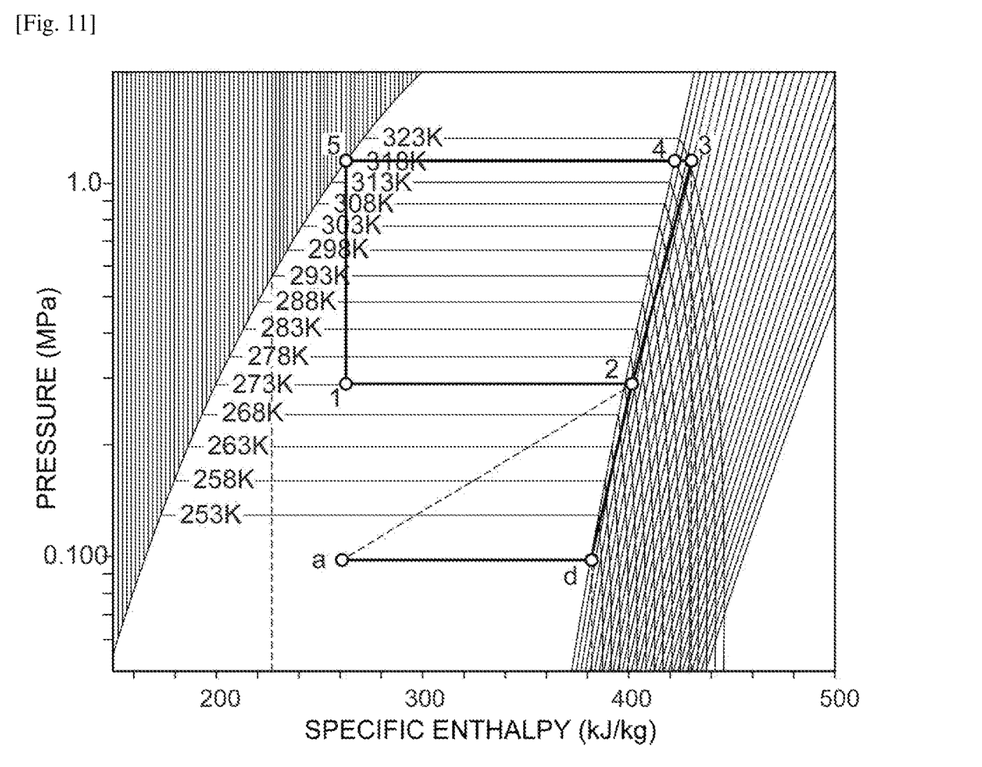
FIG. 11 is a graph illustrating an example of a refrigerant cooling generation cycle of a heat pump system of the second exemplary embodiment as a pressure-enthalpy diagram.

Specifically, the enthalpy $h_d$ in state d of the cooling generation cycle illustrated in FIG. 11 is $$h_d = 385 \text{ kJ/kg},$$

and so $$L2 = h_3 - h_d = 48 \text{ kJ/kg}.$$

Moreover, the enthalpy change amount from state 1 to state 2 in FIG. 6 and the enthalpy change amount from state 1 to state 2 in FIG. 11 are equal. Furthermore, the enthalpy change amount from state a to state d in FIG. 6 and the enthalpy change amount from state a to state d in FIG. 11 are also equal. Namely, cooling equivalent to that of the heat pump system 112 of the first exemplary embodiment can be obtained in the heat pump system 212 of the second exemplary embodiment.

In the second exemplary embodiment, the temperature of the adsorption devices 216 changes from 41.5° C. to 5.8° C. The change amount is therefore 35.7° C., this being a smaller change amount than in the first exemplary embodiment. Accordingly, the sensible heat loss Q in the adsorption devices 216 is reduced. Specifically:

$$Q = (0.71 \times 1 \times 37.5) + (1.4289 \times 1 \times 37.5) = 80.21 \text{ kJ}.$$

Based on the above, when the conversion efficiency COP of the heat pump system 212 of the second exemplary embodiment is calculated, $$COP = (q_{e1} + 1.6 \times q_{e1} - Q)/L2 = 5.78.$$

Namely, in the heat pump system 212 of the second exemplary embodiment, the cooling generation efficiency is improved by approximately 50% in comparison to the heat pump system 12 of the comparative example.

The adsorption device according to the technique of the present disclosure is not limited to a configuration in which an adsorbate is adsorbed and desorbed using an adsorbent. For example, the adsorption device may be a reaction vessel capable of reducing the system pressure to the saturated vapor pressure or lower by reacting with an adsorbate at a pressure of the saturated vapor pressure of the adsorbate or lower. The "reaction" referred to here encompasses physical adsorption, chemical adsorption, absorption, chemical reactions, and the like. For example, ammonia may be employed as the refrigerant, and a chemical heat storage reactor (using $CaCl_2$ as a reactant, for example) may be employed as the adsorption device.

The compressor is preferably a compressor that does not use oil from the perspective of suppressing any hindrance to adsorption in the adsorption device.

In the second exemplary embodiment above, although the adsorption devices 216A, 216B are illustrated by an example, the technique of the present disclosure is not limited thereto. For example, three or more adsorption devices may be used. In this case, while the refrigerant evaporated at the evaporator is being absorbed in at least one of the adsorption devices, the compressor may be used to desorb the refrigerant from at least another one of the adsorption devices.

Obviously, various modifications may be implemented within a range not departing from the spirit of the present invention.

The disclosure of Japanese Patent Application No. 2016-068698, filed Mar. 30, 2016, is incorporated herein by reference in its entirety.

All publications, patent applications, and technical standards mentioned in this present specification are herein incorporated by reference to the same extent as if each individual publication, patent application, or technical standard was specifically and indi- vidually indicated to be incorporated by reference.

REFERENCE SIGNS LIST

112 Heat pump system
114 Evaporator
116 Adsorption device
118 Compressor
120 Condenser
122 Expander 124 Refrigerant tube
128 In-cabin unit
130 Circulation tube
132 External unit
134 Cooling tube
212 Heat pump system
216 Adsorption device
224 Refrigerant tube
230 Circulation tube
234 Cooling water tube

The invention claimed is:

1. A heat pump system comprising:
an evaporator that cools a cooling target by evaporation of a refrigerant;
a compressor that compresses the refrigerant in a gaseous phase; and
an adsorption device at which the refrigerant evaporated at the evaporator is adsorbed, and that cools the cooling target by desorption of the refrigerant by movement of the refrigerant toward the compressor, wherein
the cooling target flows through at least one of the evaporator or the adsorption device, and
heat generated by cooling is expelled in a case in which the cooling target flows through the evaporator.

2. The heat pump system of claim 1, further comprising:
a condenser that condenses the refrigerant compressed by the compressor; and
an expander that causes the refrigerant condensed by the condenser to expand and conveys the refrigerant to the evaporator.

3. The heat pump system of claim 1, wherein a plurality of the adsorption devices are disposed in parallel with respect to a movement direction of the refrigerant, between the evaporator and the compressor.

4. The heat pump system of claim 3, wherein the cooling target flows through, and is cooled by, the evaporator and an adsorption device, among the plurality of adsorption devices, at which refrigerant is desorbed.

5. The heat pump system of claim 4, wherein the refrigerant is desorbed using the compressor, from an adsorption device, among the plurality of adsorption devices, that has already adsorbed the refrigerant evaporated at the evaporator.

6. The heat pump system of claim 1, wherein the adsorption device adsorbs the refrigerant at a saturated vapor pressure of the refrigerant in the evaporator.

7. A cooling generation method comprising:
generating cooling by evaporating refrigerant using an evaporator; and
generating cooling by desorbing, using a compressor, the refrigerant from an adsorption device that has already adsorbed the refrigerant evaporated at the evaporator, wherein
a cooling target flows through at least one of the evaporator or the adsorption device, and
heat generated by cooling is expelled in a case in which the cooling target flows through the evaporator.

8. The cooling generation method of claim 7, further comprising:
providing a plurality of the adsorption devices; and
while the refrigerant evaporated at the evaporator is being absorbed in at least one of the adsorption devices, using the compressor to desorb the refrigerant from at least another one of the adsorption devices.

* * * * *